(12) United States Patent
Ahn et al.

(10) Patent No.: US 6,227,251 B1
(45) Date of Patent: May 8, 2001

(54) WIRE PROTECTING STRUCTURE

(75) Inventors: Keun Sik Ahn; Jong Suk Kim, both of Kyungsangnam-Do; Young Kyu Chun, Choongchungbuk-Do, all of (KR)

(73) Assignee: Composites Industrial Service Co., LTD (KR)

( * ) Notice: Subject to any disclaimer, the term of this patent is extended or adjusted under 35 U.S.C. 154(b) by 0 days.

(21) Appl. No.: 09/515,838

(22) Filed: Feb. 29, 2000

(51) Int. Cl.[7] .................................................. F16L 9/00
(52) U.S. Cl. ............................ 138/163; 138/110; 138/167
(58) Field of Search .................................... 138/163, 166, 138/167, 168, 160, 162, 149, 110, 128

(56) References Cited

U.S. PATENT DOCUMENTS

| | | | |
|---|---|---|---|
| 3,092,530 | * 6/1963 | Plummmer | 154/44 |
| 3,934,076 | 1/1976 | Smith | 174/87 |
| 4,268,559 | * 5/1981 | Smuckler | 138/99 X |
| 4,314,094 | 2/1982 | Smith | 174/78 |
| 4,333,545 | * 6/1982 | Roberts | 138/151 X |
| 4,371,578 | * 2/1983 | Thompson | 138/167 X |
| 4,399,840 | * 8/1983 | Lee | 138/168 |
| 4,442,155 | * 4/1984 | Foertsch et al. | 138/156 X |
| 4,605,043 | * 8/1986 | Grenier | 138/149 |
| 4,665,279 | 5/1987 | Ruschkofski | 174/40 R |
| 4,860,799 | * 8/1989 | Van Noten | 138/167 |
| 4,865,890 | * 9/1989 | Erlichman | 138/166 X |
| 4,865,893 | * 9/1989 | Kunze et al. | 138/167 X |
| 5,064,971 | 11/1991 | Bogdanow | 174/169 |
| 5,300,732 | * 4/1994 | Wambeke et al. | 138/167 X |
| 5,850,056 | 12/1998 | Harwath | 174/40 CC |
| 5,924,457 | * 7/1999 | Inaba et al. | 138/162 |

OTHER PUBLICATIONS

Korean Utility Model Publication No. 1994–2351 (issued on Apr. 13, 1994): A Protective Tube for Wire and Insulator of Aerial Line.
Korean Utility Model Publication No. 1995–7610 (issued on Sep. 15, 1995): A Protective Tube for Wire and Insulator of Aerial Line.
Korean Utility Model Publication No. 1997–4488 (issued on May 12, 1997): A Protective Tube for Wire and insulator of Aerial Line.

* cited by examiner

Primary Examiner—Patrick Brinson
(74) Attorney, Agent, or Firm—Knobbe, Martens, Olson & Bear LLP

(57) ABSTRACT

A wire protecting structure for connecting the wire to a insulator mounted onto a pole is directed to facilitate reception of the wire therein and to prevent exposure of the wire therefrom. The wire protecting structure includes a tube having a slit which is longitudinally formed throughout the tube and has substantially a width to facilitate insert of the wire into the tube, and a plurality of protrusions which may be formed at outer surface of the tube; a cover for enforcing the tube to closely contact the wire to the tube, wherein an edge of the cover is integral with outer surface of the tube, other edge of the cover is provided with a plurality of holes which are held to the protrusions of the tube, and a midportion of the cover is attached to the top portion of the insulator; and elongated binders wound about the tube and the cover, in a spiral winding configuration, to hold the tube and the cover to the insulator.

20 Claims, 6 Drawing Sheets

WIRE PROTECTING STRUCTURE

BACKGROUND OF THE INVENTION

(1) Field of the Invention

This invention relates to structures for protecting electrical wires when the wires are connected to utility poles via insulators mounted onto such poles, and more particularly to a wire protecting structure which is able to facilitate reception or insertion of the wire therein and to prevent exposure of the wire therefrom.

(2) Description of the Prior Art

In the prior art, a wire has been installed to the insulator by winding binder to the wire without any protecting apparatus for the insulator and the wire when installing the wire to the insulator fixed to a utility pole.

However, so far since the binder is bound directly about the wire, this led not only to the imprecise winding of the binder about wire, but also to direct contact of the binder with the wire. This frequently resulted in ground faults due to the damage produced by rain or wind. Also, there have been problems caused by accidental wire separation, wire snapping, falling of wires to the ground, due to the infirmity of the wire installation to the insulator.

Therefore, so as to resolve the above-mentioned problems, various types of wire protecting tubes were introduced in the industry. For example, a wire protecting tube disclosed in Korea Utility Model Publication No. 94-2351 is provided with spiral groove for binding binder onto the tube, wherein the binder is inserted in the spiral groove and is wound about the tube. A wire protecting structure tube disclosed in Korea Utility Model Publication No. 95-7610 includes spiral ring protruding from the tube and integral therewith, wherein the binder is wound about the tube between flights of the spiral ring However, the wire protecting tube in publication No. 94-2351 has a disadvantage in that the binder is taken off the spiral groove, thus the banding force of the binder is relaxed. Also, the wire protecting tube in Publication No. 95-7610 has a disadvantage in that the wire can not be inserted easily into the tube because a slit can not be easily and sufficiently opened due to the tight force of the spiral ring.

Meanwhile, so as to resolve the problems and difficulties in Publication Nos. 94-2351 and 95-7610, a wire protecting tube was disclosed in Korea Utility Model Publication No. 97-4488. Also the wire protecting tube is provided with spiral ring protruding from the outer surface and integral therewith. A binder is wound about the tube between flights of the spiral ring. Bands are provided on the end of the tube, and pins projecting from the tube are provided to fit into openings in the bands.

However, the tube in Publication No. 97-4488 has a disadvantage in that since the wire is extruded from the tube when the tube is bended due to sag of the wire, the wire is injured. Also the wire still can not be easily inserted into the tube because the opening width of the slit of the tube is not sufficient.

DISCLOSURE OF THE INVENTION

Accordingly, it is an object of the present invention to provide a wire protecting structure of which the wire can be easily inserted therein and is not extruded therefrom after the wire is installed to a insulator on a pole, and which overcome the problems and difficulties encountered in conventional wire protecting tubes.

It is other object of the present invention to provide an improved wire protecting structure which is capable of enhancing the protection of the wire and the binding performance of the binder.

To achieve the above objects, in accordance with preferred embodiment of the present invention, there is provided a wire protecting structure for connecting the wire to a insulator mounted onto a pole, comprising: a tube having a slit which is longitudinally formed throughout the tube and has substantially a width to facilitate insert of the wire into the tube, and a plurality of protrusions which may be formed at outer surface of the tube; a cover for enforcing the tube to closely contact the wire with the tube, wherein an edge of the cover is integral with outer surface of the tube, other edge of the cover is provided with a plurality of holes which are held to the protrusions of the tube, a mid-portion of the cover is attached to top portion of the insulator; and elongated binders to be wound about the tube and the cover, in a spiral winding configuration, to hold the tube and the cover to the insulator.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
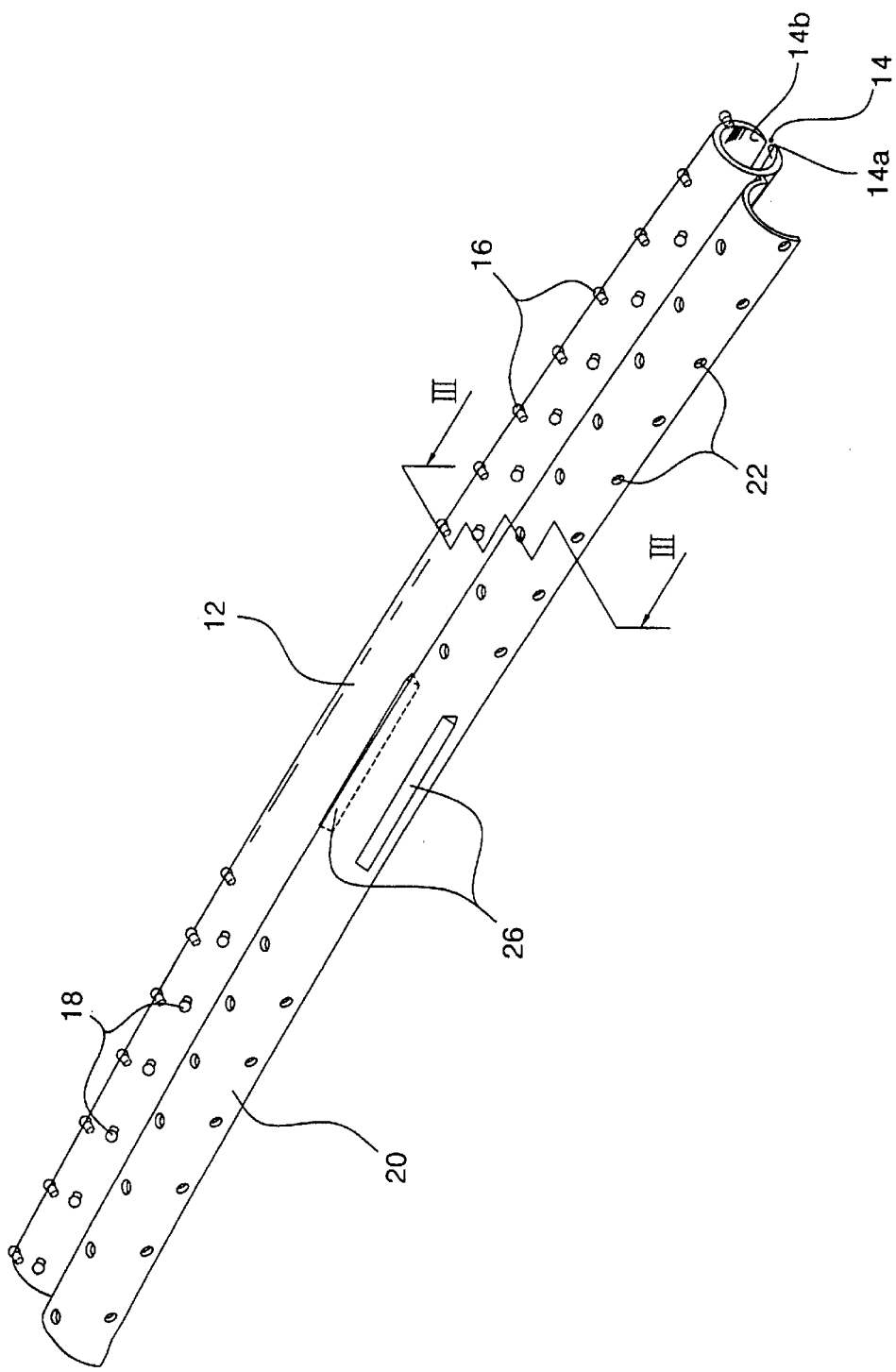
FIG. 1 is a perspective view showing a tube and a cover of a wire protecting structure according to a preferred embodiment of the present invention.
Figure 2:
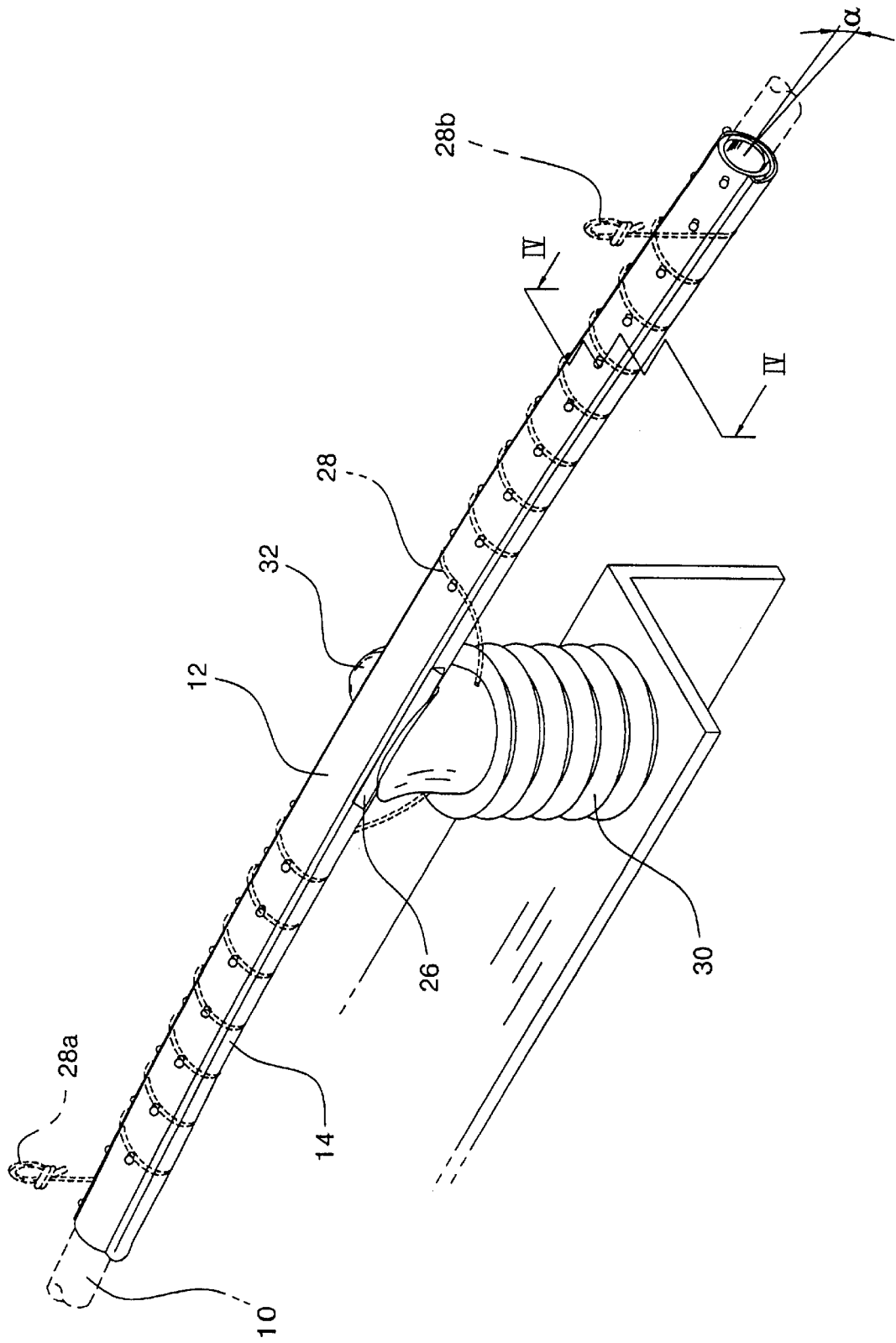
FIG. 2 is a perspective view showing a wire protecting structure connected on insulator via binder.
Figure 3:
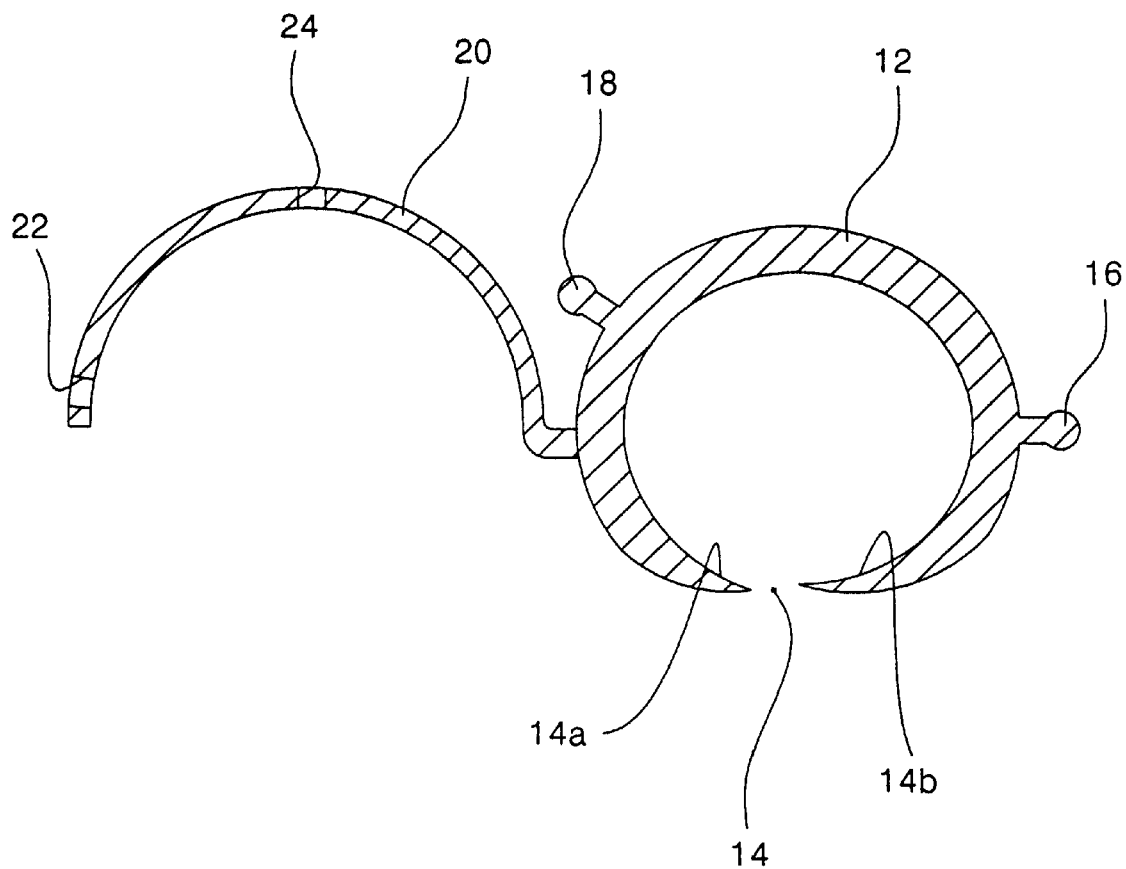
FIG. 3 is a section view taken on line III—III in FIG. 1.

Referring to the accompanying drawings, in FIG. 1 and FIG. 2, a wire protecting structure according to a preferred embodiment of the present invention includes a tube 12 in which a wire 10 is inserted and protected. A slit 14 may extend throughout the protective tube 12. The wire 10 is inserted through the slit 14 and received into the tube 12. Preferably, the slit 14 has sufficient width to further facilitate insert of the wire 10 into the tube 12.

Here, each of edges 14a and 14b forming the slit 14 may be formed in flip type which can be overlapped each other after insert of the wire into the tube 12.

Particularly, the tube 12 may be bended and formed in a bending angle α which consider a bending angle of the wire 10 after installing the wire on the insulator. Preferably, the bending angle α is about 2° to 3°. Also, the tube 12 is formed of non-metallic materials such as hardened rubber or rigid plastic having any flexibility.

A member for holding a cover to be described herein below may be formed at a portion of outer surface of the tube 12. The holding member includes a plurality of protrusions 16 which are protruded in a row between one end and other end of the tube 12. Similarly, a plurality of bosses 18 may be formed at the other portion of outer surfaces of the tube 12. The bosses 18 are protruded in similar to the protrusions 16, but each of bosses 18 is positioned in diagonal direction relative to the protrusions 16 so that binders to be described may be wound, in a spiral direction or in a spiral configuration, about the tube and the cover. Accordingly, a plurality of the protrusions 16 and a plurality of the bosses 18 consist of a spiral structure of which the binders to be described are spirally wounded about the tube and the cover. Alternatively, a mid-portion of the protective tube 12 is not provided with the protrusions 16 and the bosses 18 so that the wire protecting structure can be easily connected to the insulator without preventing each other.

A cover 20 is formed in place of the tube 12. The cover 20 is provided with a plurality of holes 22 in which each of protrusions 16 are inserted and held. Alternatively, a plurality of drain holes 24 are formed in length direction of the cover 20 in order to drain water or rain. In addition, a mid-portion of the cover 20 is provided with stoppers 26 to prevent the rotation of the cover 20 relative to the insulator when the cover is attached on the top portion of the insulator.

The cover 20 may be formed pivotally and integrally at the tube 12, and may be formed of non-metallic material similar to that of the tube 12. Preferably, the cover 20 has a suitable size or width so that the wire 10 can be compressed by the tube 20 when the holes 22 of the cover 20 are held to the protrusions 16.

Also, the cover 20 may be bended in a bending angle which is similar to the bending angle α of the tube 12. Preferably, the mid-portion of the cover 20 is not provided with the drain holes 24 so that rain or water which may inflow between the cover 20 and the tube 12 can not be drained on the top portion of the insulator.

Figure 5:
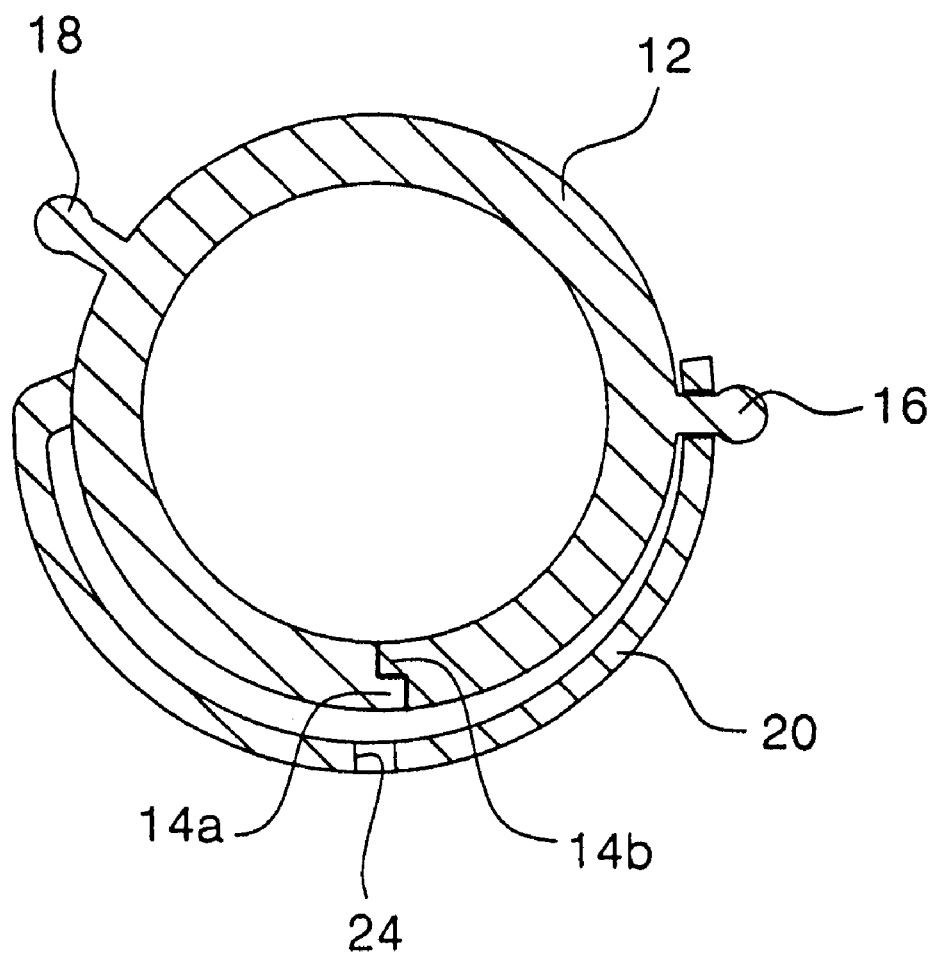
FIG. 5 is a section view, similar to FIG. 4, of other embodiment of the present invention.

Alternatively, in FIG. 5, in order to provide further protection of the wire 10 in the tube 12, a step is formed at the edge 14a of each of edges forming the slit 14, while other step which may match with the step is formed at other edge 14b of the slit 14.

Figure 6:
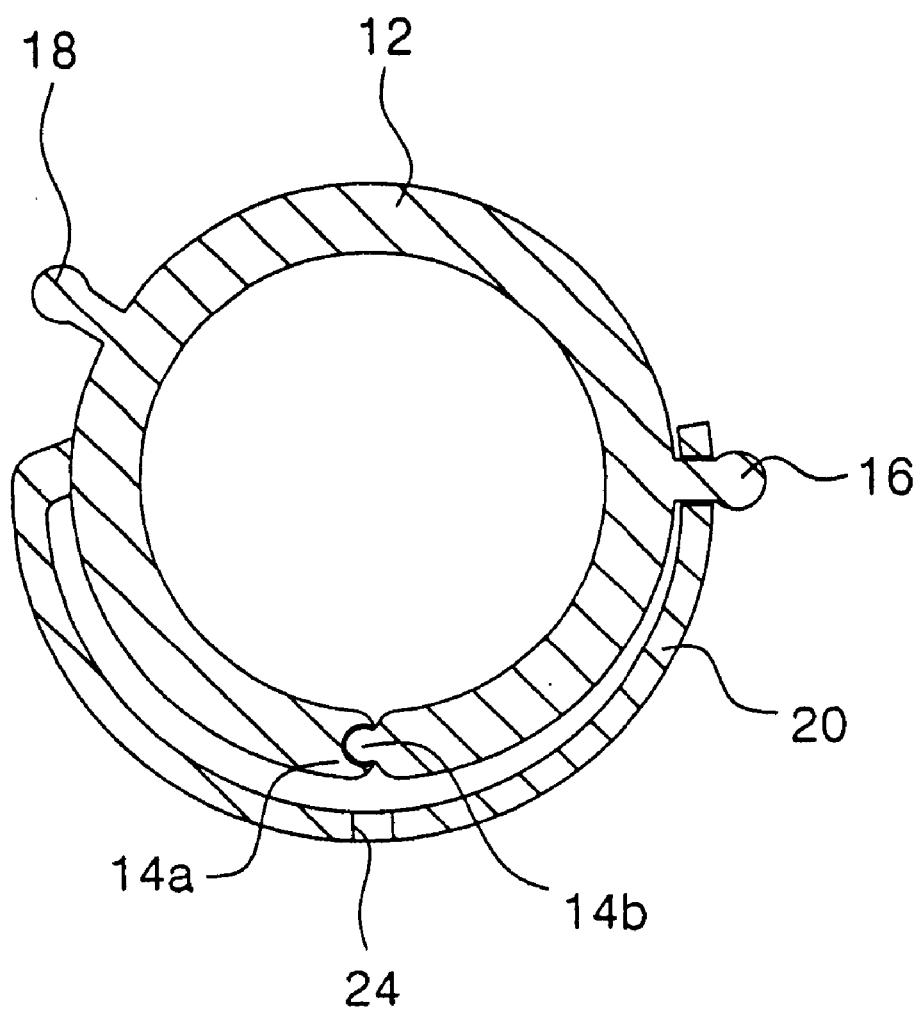
FIG. 6 is a section view, similar to FIG. 5, of another embodiment of the present invention.

Also, in FIG. 6, a longitudinal groove is formed at the edge 14a of each of edges forming the slit 14, while a longitudinal holder which may be removably inserted into the longitudinal groove is formed at other edge 14b of the slit 14.

Figure 4:
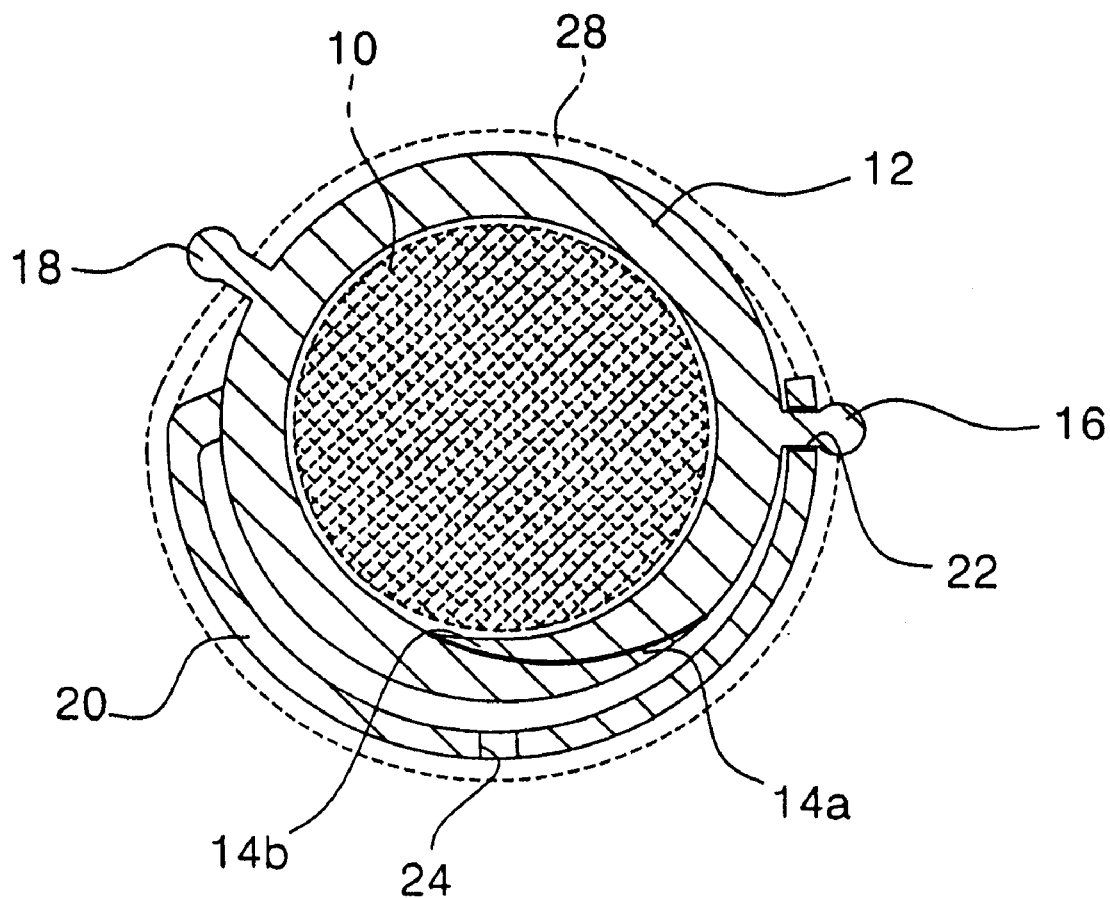
FIG. 4 is a section view taken on line IV—IV in FIG. 2.

Meanwhile, in FIG. 2 and FIG. 4, the tube 12 and the cover 20 may be attached to the top portion of the insulator 30 by binders 28. The binders 28 are already provided to the insulator 30, otherwise the binders 28 may be provided to the insulator 30 when the cover 20 is attached to the top portion of the insulator 30. The binders 28 are formed of copper wire or metal wire. Also, the binders 28 are spirally and tightly wound about the tube 12 and the cover 20, and in the spaces between the flights of the spiral structure to be formed by the protrusions 16 and the bosses 18 of the tube 12, to compress to the tube 12 and the cover 20 and to hold then the insulator 30. The binders 28 also extend tightly about the mid-portion of the tube 12 and the cover 20 at opposite sides thereof.

A mode for connecting the wire to the insulator on the pole using a wire protecting structure according to the present invention will now be explained with reference to the drawings.

In order to connect the wire 10 to the insulator 30 mounted onto the pole, a portion of the wire 10 is passed through the slit 14 and received in the tube 12. The wire 10 can be easily inserted into the tube 12 because the slit 14 has sufficient width. Also, in order to closely attach the tube 12 to the wire 10, the cover 20 is held to the tube 12 as the holes 22 of the cover 20 are held to the protrusions 16 of the tube 12.

At this time, as shown in FIG. 4, an edge 14a and other edge 14b forming the slit 14 are overlapped each other, as shown in FIG. 5, the step formed at the edge 14a matches with the other step formed at the edge 14b, or as shown in FIG. 6, the longitudinal holder formed at the edge 14b is inserted into the longitudinal groove of formed at the edge 14a.

Thereafter, the mid-portion of the cover 20 held to the protective tube 12 in which the wire 10 is received and held is placed on the top portion 32 of the insulator 30. Then, the tube 12 and the cover 20 are attached and held to the insulator 30 by the binders 28, also they are wound and bound together by the binders 28, wherein the binders 28 are spirally wound about the tube 12 and the cover 20 by the protrusions 16 and the bosses 18 of the tube 12, and the ends 28a and 28b of the binder 28 are twist connected as by winding upstanding loop lengths of the binders.

In addition, the stoppers 26 formed at the mid-portion of the cover 20 prevent rotation of the wire protecting structure relative to the insulator 30. Also, as the wire protecting structure may be bended and formed already in bending angle α of 2° to 3°, the slit 14 is not opened although the wire 10 is slagged when the wire 10 is connected to the insulator 30 on the pole. In addition, the water or rain which may inflow between the tube 12 and the cover 20 are discharged through the drain holes 24 of the cover 20.

As described above, the wire protecting structure for connecting wire to the insulator on the pole according to the present invention is directed to facilitate insertion or reception of the wire into the tube because of the sufficient width of the slit of the tube, while to prevent exposure of the wire from the tube after the wire is connected to the insulator.

Although the preferred embodiments of the present invention have been disclosed for illustrative purposes, those skilled in the art will appreciate that various modifications, additions and substitutions are possible, without departing from the scope and spirit of the present invention as described in the accompanying claims.

What is claimed is:

1. A wire protector comprising:
    a first structure defining a longitudinal hollow space configured to receive a wire and a longitudinal slit configured to insert a wire into the hollow inner space therethrough;
    a second structure configured to cover the slit;
    a plurality of locking devices provided on the first and second structures, the locking devices enabling the first and second structures to stick together while the second structure covers the slit;
    wherein the second structure comprises a longitudinal body and two longitudinal edges of the body, the body being adapted to cover the slit; and
    wherein one longitudinal edge of the second structure is bound to the first structure while allowing the other longitudinal edge to be free to move relative to the first structure.

2. The wire protector as defined in claim 1, wherein the locking device comprise a hole and a protrusion configured to be held when pass therethrough.

3. The wire protector as defined in claim 1, wherein the first and second structures are made of a non-metallic material.

4. The wire protector as defined in claim 1, wherein a surface of the body of the second structure is configured to close contact with the first structure.

5. The wire protector as defined in claim 1, wherein the free longitudinal edge of the second structure is configured to be attached to the first structure by locking the plurality of locking devices.

6. The wire protector as defined in claim 5, wherein the plurality of locking devices are provided on the body of the second structure near the free longitudinal edge and on the first structure where the free longitudinal edge of the second structure is to be attached.

7. A wire protector comprising:
   a first structure defining a longitudinal hollow space configured to receive a wire and a longitudinal slit configured to insert a wire into the hollow inner space therethrough;
   a second structure configured to cover the slit, wherein the second structure comprises a longitudinal body and two longitudinal edges of the body, the body being adapted to cover the slit;
   a plurality of locking devices provided on the first and second structures, the locking devices enabling the first and second structures to stick together while the second structure covers the slit; and
   wherein the second structure further comprises a plurality of drain holes.

8. The wire protector as defined in claim 7, wherein the first structure comprises a rolled longitudinal body and two opposing longitudinal edges of the rolled body, the rolled body defines the hollow space therein and the two opposing edges define the slit therebetween.

9. The wire protector as defined in claim 8, wherein the first structure is made of a material allowing the body to be further rolled when force is applied.

10. The wire protector as defined in claim 9, wherein the two edges of the first structure are configured to allow the edges to overlap with the rolled body or to engage with each other.

11. The wire protector as defined in claim 9, wherein a step is provided with one edge of the first structure and another step matching with the other is provided with the other edge of the first structure.

12. The wire protector as defined in claim 7, wherein a projection is provided with one edge of the first structure and a groove to hold the projection is provided with the other edge of the first structure.

13. A wire protector comprising:
   a first structure defining a longitudinal hollow space configured to receive a wire and a longitudinal slit configured to insert a wire into the hollow inner space therethrough;
   a second structure configured to cover the slit;
   a plurality of locking devices provided on the first and second structures, the locking devices enabling the first and second structures to stick together while the second structure covers the slit; and
   wherein the second structure comprises at least one stopper configured to prevent movement of the wire protector when installed on top of a electric pole insulator.

14. The wire protector as defined in claim 13, wherein the wire protector comprises two arms with reference to the center in its longitudinal direction, each arm is bent at 2 to 3° in a direction toward the slit from the first structure.

15. The wire protector as defined in claim 13, further comprising a string to be used to wind around the first and second structures.

16. The wire protector as defined in claim 15, wherein the first structure comprises a plurality of protrusions configured to guide the string.

17. The wire protector as defined in claim 15, wherein the plurality of locking devices comprises a plurality of protrusions provided on the first structure and a plurality of holes provided on the second structure, each protrusion is configured to be held and to guide the string when passing through a hole.

18. The wire protector as defined in claim 13, wherein the second structure comprises a longitudinal body and two longitudinal edges of the body, the body being adapted to cover the slit.

19. The wire protector as defined in claim 13, wherein one longitudinal edge of the second structure is bound to the first structure while allowing the other longitudinal edge to be free to move relative to the first structure.

20. A method of installing a wire protector to an electric pole, comprising:
   providing a first structure defining a longitudinal hollow space and a longitudinal slit;
   inserting a wire into the longitudinal hollow space through the longitudinal slit;
   covering the slit with a second structure; and
   locating the second structure on an insulator of an electric pole.

* * * * *